(12) United States Patent
Riley et al.

(10) Patent No.: US 8,868,032 B2
(45) Date of Patent: Oct. 21, 2014

(54) METHODS, SYSTEMS, AND COMPUTER READABLE MEDIA FOR AUTOMATIC, RECURRENT ENFORCEMENT OF A POLICY RULE

(75) Inventors: Yusun Kim Riley, Marlborough, MA (US); Uri Baniel, Buffalo Grove, IL (US)

(73) Assignee: Tekelec, Inc., Morrisville, NC (US)

( * ) Notice: Subject to any disclaimer, the term of this patent is extended or adjusted under 35 U.S.C. 154(b) by 156 days.

(21) Appl. No.: 13/093,465

(22) Filed: Apr. 25, 2011

(65) Prior Publication Data

US 2011/0263238 A1 Oct. 27, 2011

Related U.S. Application Data

(60) Provisional application No. 61/327,490, filed on Apr. 23, 2010.

(51) Int. Cl.
*H04M 11/00* (2006.01)
*H04W 24/02* (2009.01)
*H04M 15/00* (2006.01)
*H04W 4/24* (2009.01)

(52) U.S. Cl.
CPC .............. *H04W 24/02* (2013.01); *H04M 15/66* (2013.01); *H04M 15/00* (2013.01); *H04W 4/24* (2013.01)
USPC ........ 455/408; 455/406; 455/407; 455/435.1; 379/114.22; 379/114.23; 379/114.27; 379/126; 379/127.05

(58) Field of Classification Search
CPC .... H04W 4/24; H04W 24/08; H04L 41/5029; H04L 12/14; H04L 12/1403; H04L 12/1407; H04L 12/1417; H04L 12/1467; H04M 15/00; H04M 15/66; H04M 15/68; H04M 15/80

USPC ...................... 455/406, 435.1, 418, 407, 408; 379/114.22, 114.23, 114.27, 114.28, 379/127.16, 126
See application file for complete search history.

(56) References Cited

U.S. PATENT DOCUMENTS

| | | | | |
|---|---|---|---|---|
| 2008/0153458 | A1* | 6/2008 | Noldus et al. | 455/406 |
| 2009/0228956 | A1* | 9/2009 | He et al. | 726/1 |
| 2009/0305684 | A1* | 12/2009 | Jones et al. | 455/418 |
| 2010/0296415 | A1* | 11/2010 | Sachs et al. | 370/254 |

OTHER PUBLICATIONS

3GPP, "3rd Generation Partnership Project; Technical Specification Group Services and System Aspects; Policy and charging control architecture," 3GPP TS 23.203, V11.1.0, pp. 1, 25-71, and 87-95 (Mar. 2011).

* cited by examiner

*Primary Examiner* — Olumide T Ajibade Akonai
*Assistant Examiner* — Edward Zhang
(74) *Attorney, Agent, or Firm* — Jenkins, Wilson, Taylor & Hunt, P.A.

(57) ABSTRACT

Methods, systems, and computer readable media for automatic, repetitive enforcement of a policy rule according to a schedule are disclosed. According to one aspect, a method for automatic, recurrent enforcement of a policy rule includes providing, to a node for enforcing policy rules in a telecommunications network, an automatically recurrent policy rule, the policy rule defining an enforcement activation condition and including an enforcement recurrence attribute; and using, at the node, the enforcement activation condition and the enforcement recurrence attribute to recurrently activate the enforcement of the policy rule according to the enforcement recurrence attribute.

16 Claims, 6 Drawing Sheets

```
Charging-Rule-Install ::=
            < AVP Header: 1001 >
            *[ Charging-Rule-Definition ]
            *[ Charging-Rule-Name ]
            *[ Charging-Rule-Base-Name ]
            [ Bearer-Identifier ]
            [ Rule-Activation-Time ]
            [ Rule-Deactivation-Time ]
            [ Resource-Allocation-Notification ]
            [ Automatic-Rule-Enforcement ]
            *[ AVP ]

Automatic-Rule-Enforcement ::=
            < AVP Header: XXXX >
            [ Day-For-Enforcement ]
            [ Time-For-Enforcement ]
            [ Duration-For-Enforcement ]
            [ Recurrence-Interval ]
            [ Number-Of-Recurrences ]
```

FIG.6

METHODS, SYSTEMS, AND COMPUTER READABLE MEDIA FOR AUTOMATIC, RECURRENT ENFORCEMENT OF A POLICY RULE

PRIORITY CLAIM

This application claims the benefit of U.S. Provisional Patent Application Ser. No. 61/327,490, filed Apr. 23, 2010; the disclosure of which is incorporated herein by reference in its entirety.

TECHNICAL FIELD

The subject matter described herein relates to methods and systems for policy enforcement. More particularly, the subject matter described herein relates to methods, systems, and computer readable media for automatic, recurrent enforcement of a policy rule.

BACKGROUND

According to the third generation partnership project (3GPP) policy and charging control (PCC) standard, it is possible for a policy and charging rules function (PCRF) to install a policy rule into the policy and charging enforcement function (PCEF) or bearer binding and event reporting function (BBERF) such that the enforcement of the rule will take place at a future point in time. This can be accomplished using attribute-value pair (AVP) known as AVP Rule-Activation-Time. However, the 3GPP PCC standard has no provision to automatically repeat the enforcement of the rule, or to automatically repeat the enforcement of the rule according to some schedule, such as to repeat enforcement of the rule during some interval of the day/week. Accordingly, there exists a need for methods, systems, and computer readable media for automatic, recurrent enforcement of a policy rule.

SUMMARY

According to one aspect, the subject matter described herein includes a network entity for automatic, recurrent enforcement of a policy rule. The network entity includes a rules database for maintaining policy rules, wherein at least one policy rule comprises an automatically recurrent policy rule that defines an enforcement activation condition and includes an enforcement recurrence attribute, and a rules engine for using the enforcement activation condition and the enforcement recurrence attribute to recurrently activate the enforcement of the policy rule according to the enforcement recurrence attribute.

According to one aspect, the subject matter described herein includes a system for automatic, recurrent enforcement of a policy rule. The system includes a first node for enforcing automatically recurrent policy rules in a telecommunications network and a second node for providing automatically recurrent policy rules to the first node. The automatically recurrent policy rule defines an enforcement activation condition and includes an enforcement recurrence attribute. The first node uses the enforcement activation condition and the enforcement recurrence attribute to recurrently activate the enforcement of the policy rule according to the enforcement recurrence attribute.

As used herein, the term "node" refers to a physical computing platform with at least one processor, memory, and a network interface.

According to one aspect, the subject matter described herein includes a method for automatic, recurrent enforcement of a policy rule. The method includes providing, to a node for enforcing policy rules in a telecommunications network, an automatically recurrent policy rule, the policy rule defining an enforcement activation condition and including an enforcement recurrence attribute and using, at the node, the enforcement activation condition and the enforcement recurrence attribute to recurrently activate the enforcement of the policy rule according to the enforcement recurrence attribute.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 6 illustrates the syntax of an exemplary policy rule that defines an enforcement activation condition and an enforcement recurrence attribute according to an embodiment of the subject matter described herein.

DETAILED DESCRIPTION

In accordance with the subject matter disclosed herein, methods, network entities, and computer readable media are provided for automatic, recurrent enforcement of a policy rule.

Reference will now be made in detail to exemplary embodiments of the present invention, examples of which are illustrated in the accompanying drawings. Wherever possible, the same reference numbers will be used throughout the drawings to refer to the same or like parts.

Figure 1:
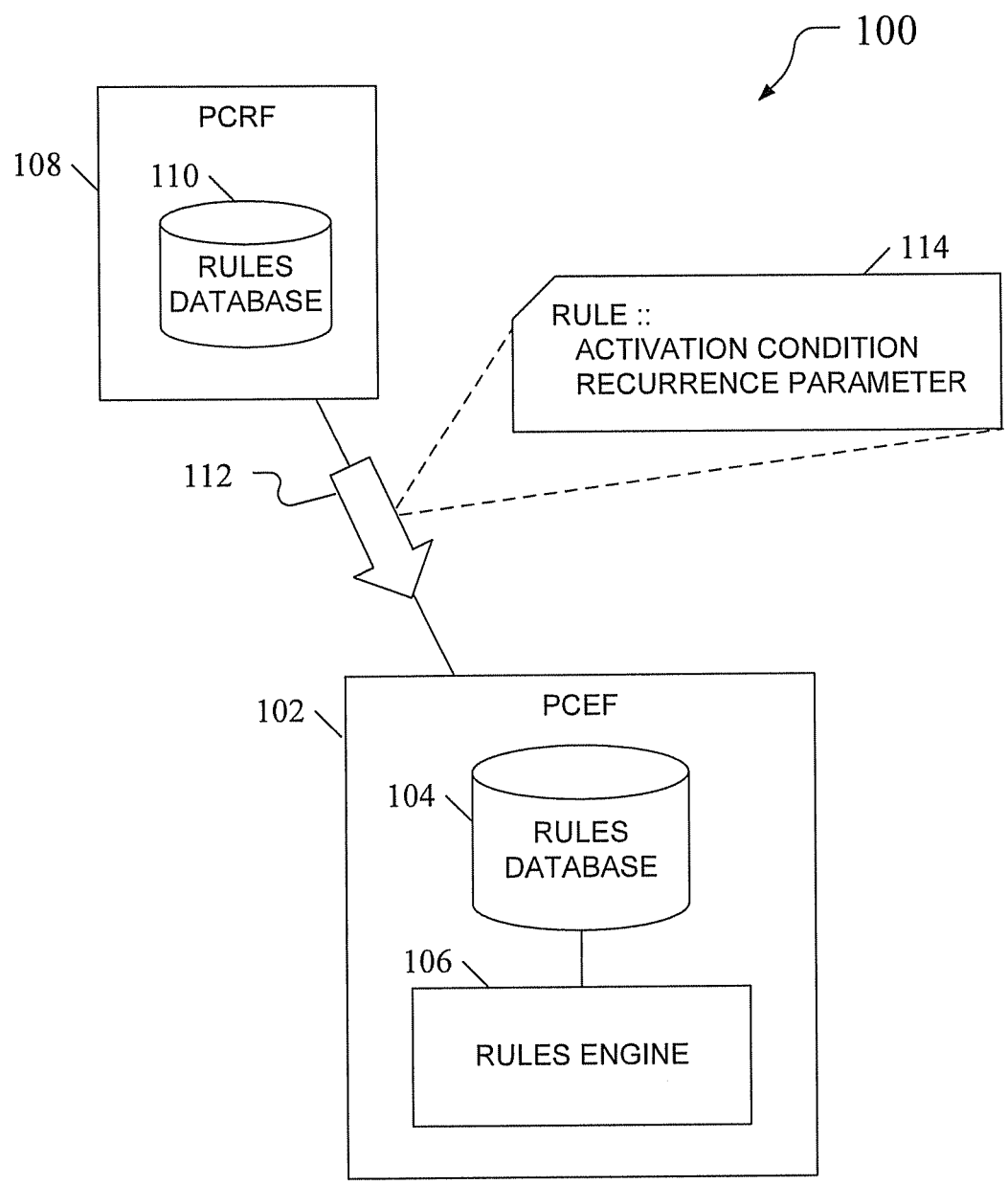
FIG. 1 is a block diagram illustrating an exemplary system for automatic, recurrent enforcement of a policy rule according to an embodiment of the subject matter described herein, the system including an exemplary network entity for automatic, recurrent enforcement of a policy rule according to an embodiment of the subject matter described herein.

FIG. 1 is a block diagram illustrating an exemplary system for automatic, recurrent enforcement of a policy rule according to an embodiment of the subject matter described herein. System 100 includes an exemplary network entity 102 for automatic, recurrent enforcement of a policy rule according to an embodiment of the subject matter described herein. Network entity 102 may be, for example, a PCEF, a BBERF, or other type of policy enforcement point (PEP) in a network. In the embodiment illustrated in FIG. 1, network entity 102 includes a rules database 104 and a rules engine 106. Network entity 102 may be a stand-alone network node or a component of another node, such as a GPRS support node (GGSN).

Rule database 104 maintains policy rules, including one or more automatically recurrent policy rules. In one embodiment, each automatically recurrent policy rule defines an enforcement activation condition and an enforcement recurrence attribute.

Rules engine 106 applies the policy rules maintained in rules database 104, including automatically recurrent policy rules. In one embodiment, rules engine 106 uses an automatically recurrent policy rule's enforcement activation condition and enforcement recurrence attribute to automatically activate and deactivate the enforcement of the policy rule according to the enforcement recurrence attribute.

In one embodiment, network entity 102 may receive policy rules, including automatically recurrent policy rules, from a PCRF or other policy decision point (PDP), from another type of node in the network, from the network operator, or other source. In the embodiment illustrated in FIG. 1, for example, network entity 102 may receive policy rules from PCRF 108, which may have its own policy rules database 110. PCRF 108 may send a message 112 to network entity 102, the message containing example automatically recurrent policy rule 114 that defines an enforcement activation condition and an enforcement recurrence attribute. In one embodiment, automatically recurrent policy rule 114 may also include an enforcement deactivation condition. In an alternative embodiment, an enforcement deactivation condition may be derived from the enforcement activation condition and the enforcement recurrence attribute. PCRF 108 may be a stand-alone network node or a component of another node.

Network entity 102 may receive policy rules in response to a request that it has issued, or may receive policy rules unilaterally, e.g., without having requested them. In one embodiment, network entity 102 may issue a request for policy rules in response to some event or the detection of some condition or trigger. An example of this process is shown in FIG. 2.

Figure 2:
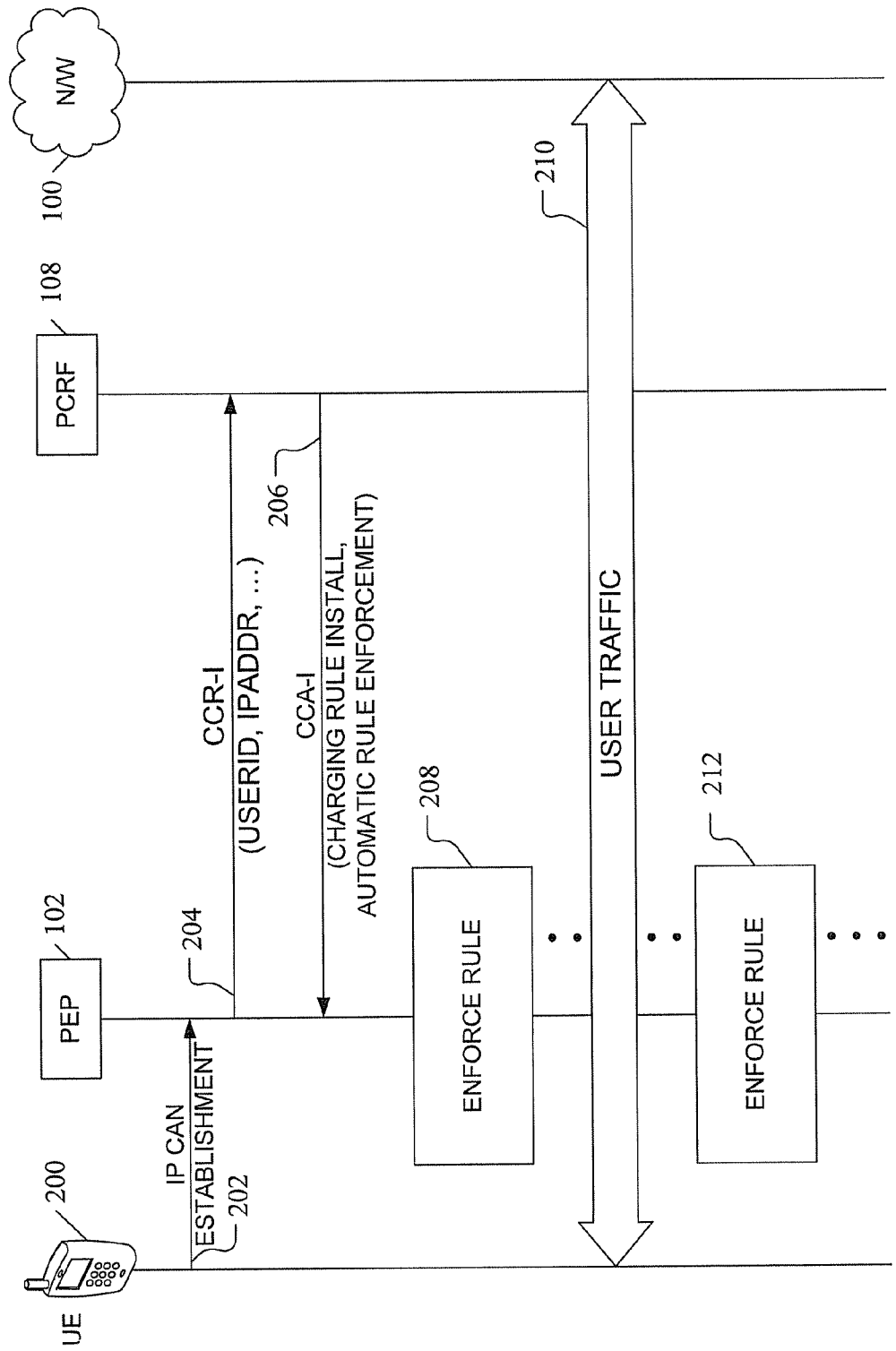
FIG. 2 is a signaling message flow diagram illustrating exemplary messages communicated between telecommunication nodes in a system for automatic, recurrent enforcement of a policy rule according to an embodiment of the subject matter described herein.

FIG. 2 is a signaling message flow diagram illustrating exemplary messages communicated between telecommunication nodes in a system for automatic, recurrent enforcement of a policy rule according to an embodiment of the subject matter described herein. In the embodiment illustrated in FIG. 2, network entity 102, which is a policy enforcement point (PEP), detects a condition that requires a policy enforcement rule. For example, a user equipment (UE) 300 sends to network entity 102 a request to gain access to network 100. In the embodiment illustrated in FIG. 2, UE 200 sends an Internet protocol connectivity access network (IP CAN) establishment request 202 to network entity 102.

In response, network entity 102 may send a request message 204 to policy decision point (PDP) 108, requesting policy information. In one embodiment, request message 204 may be a Diameter protocol message. In the embodiment illustrated in FIG. 2, for example, request message 204 may be a Diameter credit control request (CCR) initial message, or CCR-I, that includes the identity of the subscriber (USERID) and the network address of the subscriber's UE (IPADDR).

PDP 108 may respond to the CCR-I message 204 with a Diameter credit control answer (CCA) initial message, or CCA-I 206, that includes an automatic, recurrent policy rule and an instruction for network entity 102 to install that rule in its own rules database. Once the new policy rule is installed, at block 208 network entity 102 enforces the new policy rule and any other applicable policy rules that have also been installed. If the pertinent policy rules allow UE 200 to access network 100, a session 210 will be established between UE 200 and network 100. Block 212 is a recurrent enforcement of the policy rule previously enforced in block 208. This rule is recurrently enforced according to the enforcement recurrence attributes of the rule.

Figure 3:
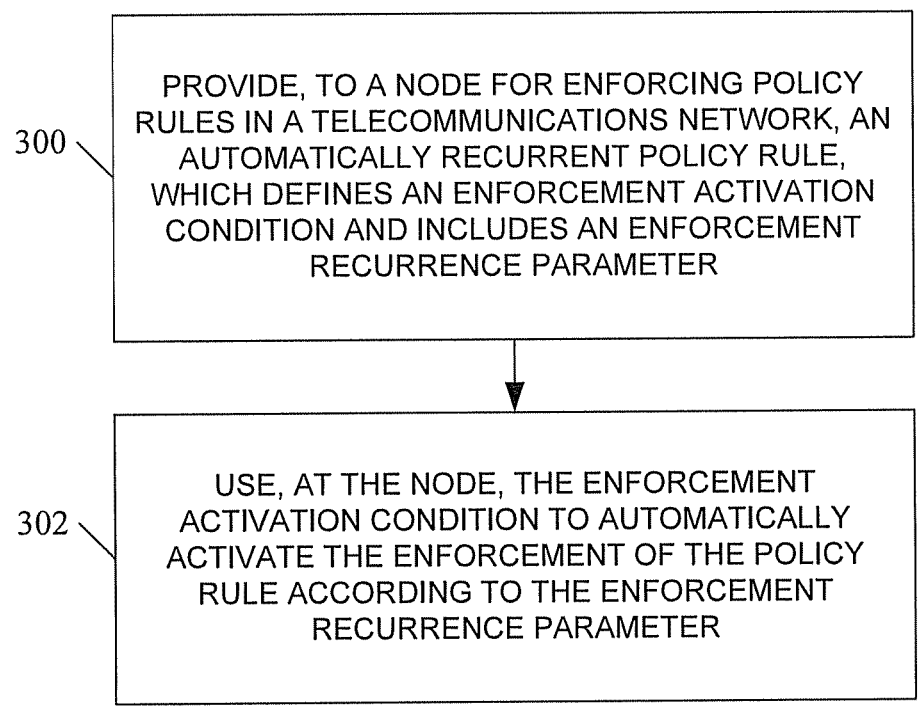
FIG. 3 is a flow chart illustrating an exemplary process for automatic, recurrent enforcement of a policy rule according to an embodiment of the subject matter described herein.

FIG. 3 is a flow chart illustrating an exemplary process for automatic, recurrent enforcement of a policy rule according to an embodiment of the subject matter described herein.

At block 300, an automatically recurrent policy rule, which defines an enforcement activation condition and an enforcement recurrence attribute, is provided to a node for enforcing policy rules in a telecommunications network.

At block 302, the node uses the enforcement activation condition to automatically activate and deactivate the enforcement of the policy rule according to the enforcement recurrence attribute. This process is shown in more detail in FIGS. 4 and 5.

Figure 4:
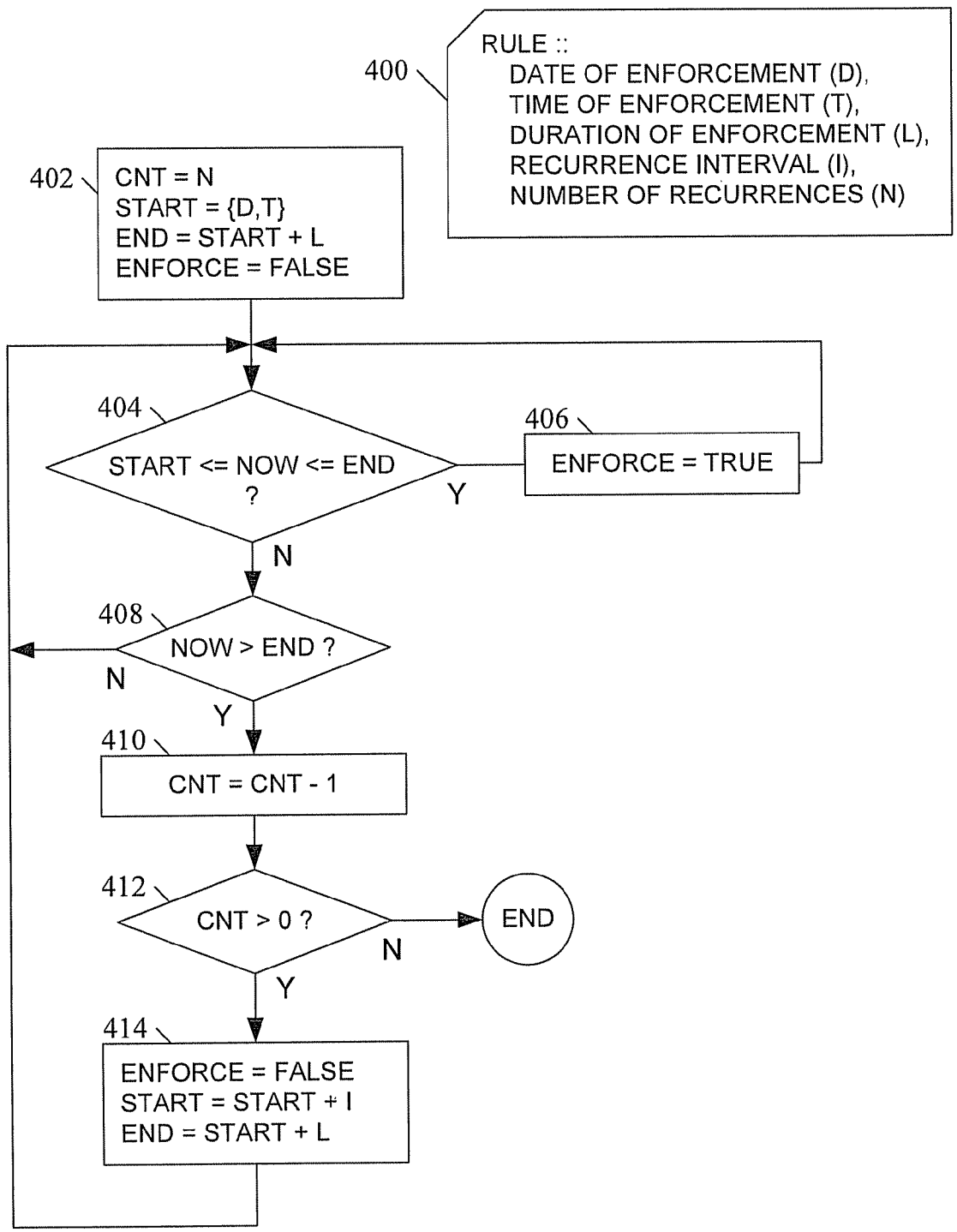
FIG. 4 is a flow chart illustrating in more detail an exemplary process for automatic, recurrent enforcement of a policy rule according to an embodiment of the subject matter described herein.

FIG. 4 is a flow chart illustrating in more detail an exemplary process for automatic, recurrent enforcement of a policy rule according to an embodiment of the subject matter described herein. In the embodiment illustrated in FIG. 4, an example automatically recurrent policy rule 400 includes: information that defines an enforcement activation condition, e.g., a date of enforcement (D) and a time of enforcement (T); information that defines an enforcement deactivation condition, e.g., a duration or length of enforcement (L); and one or more recurrence attributes, e.g., a recurrence interval (I) and a number of recurrences (N).

In the embodiment illustrated in FIG. 4, the process begins at block 402, which initializes several variables, including a count variable CNT, which is initialized to the value N; a START variable, which is set using the date and time values D and T, respectively; an END variable, which is set to the value START plus duration L; and the variable ENFORCE, which is set to TRUE to indicate that the policy rule is to be enforced or FALSE to indicate that the policy rule is not to be enforced.

At block 404, the process enters a loop that continually checks to see if the current date and time, indicated by the variable NOW, is within the enforcement window delimited by the values of START and END. If so, the process moves to block 406, which sets the status ENFORCE to TRUE, indicating that the policy rule is to be enforced, and the returns to block 404 at the top of the loop.

If instead the current date and time is not within the enforcement window delimited by the values of START and END, the process moves to block 408, which checks to see whether NOW is after END; if not, the window of enforcement has not yet begun, and the process returns to the top of the loop.

If instead the current date and time is after the end of the enforcement window, the process moves to block 410, where the value of CNT is decremented.

At block 412 the value of CNT is checked to see if it is greater than zero, which would indicate that the maximum number of recurrences has not yet occurred. If CNT is not greater than zero, the process ends. Otherwise, the process moves to block 414.

At block 414, the status of ENFORCE is set to FALSE, indicating that enforcement of the policy rule should be suspended. The next window of enforcement is calculated by adding the value of the recurrence interval (I) to START and by setting END to the value of the new START plus the duration value L. The process then returns to the top of the loop.

Figure 5:
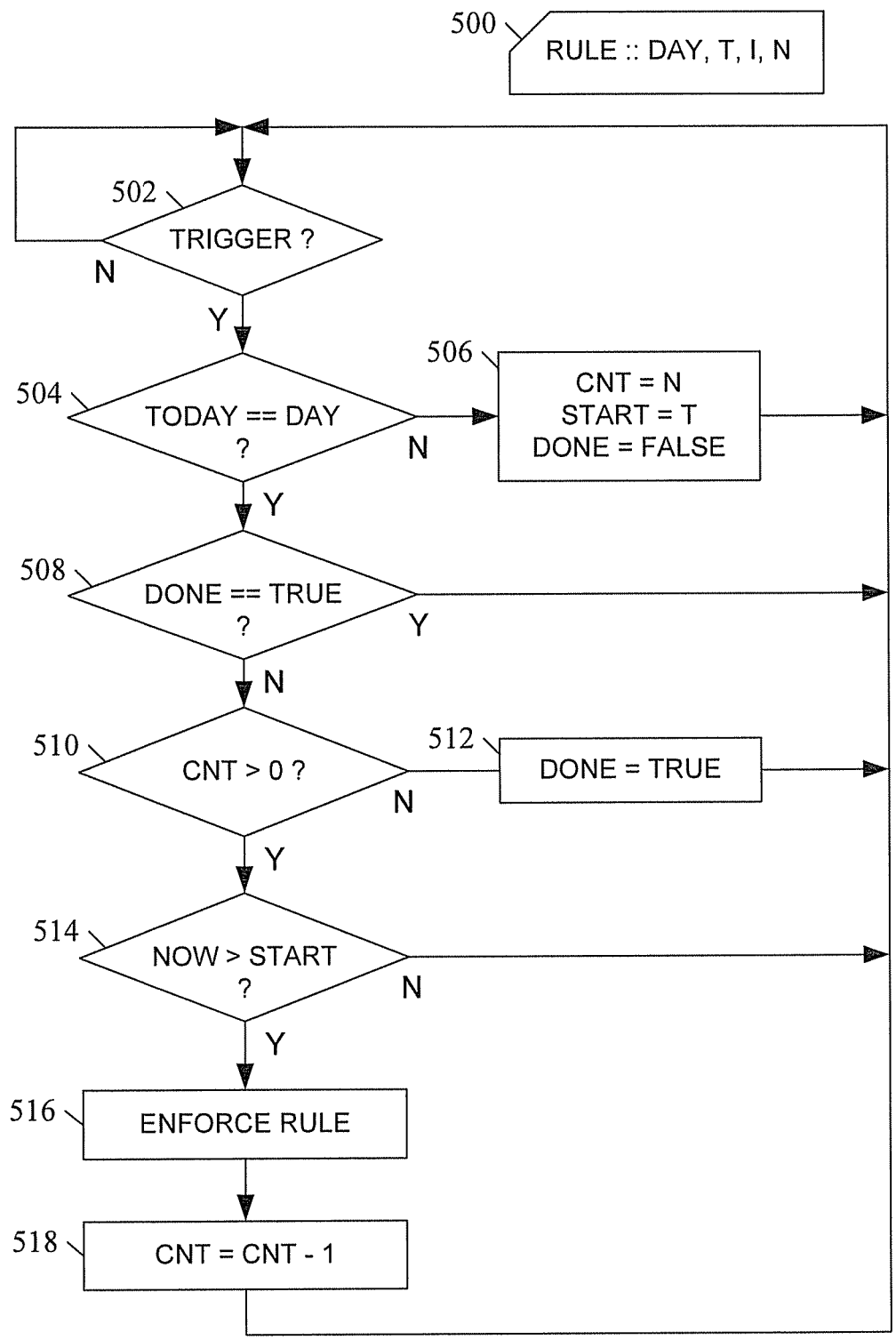
FIG. 5 is a flow chart illustrating in more detail an exemplary process for automatic, recurrent enforcement of a policy rule according to another embodiment of the subject matter described herein.

Thus, FIG. 4 illustrates an automatically recurrent policy rule that is enforced during a defined enforcement window, then not enforced until the arrival of the next enforcement window. The count N defines how many enforcement windows will occur before the rule is deactivated. Note that activation of the policy rule and activation of an enforcement window are separate and independent concepts: a policy rule can be active even though enforcement of that policy rule is not. FIG. 5, on the other hand, illustrates another implementation of an automatically recurrent policy rule—one that defines how many times an enforcement window can be present each day, or for a particular day.

FIG. 5 is a flow chart illustrating in more detail an exemplary process for automatic, recurrent enforcement of a policy rule according to another embodiment of the subject matter described herein. Like rule 400 in FIG. 4, the example automatically recurrent policy rule 500 in FIG. 5 also includes information that defines an enforcement activation condition, but in rule 500, this information identifies a day of the week (DAY). The other attributes T, I, and N are similar to their like-named counterparts in FIG. 4, and therefore their explanations will not be repeated here.

In the embodiment illustrated in FIG. 5, the process includes, at block 502, looping until a trigger or evaluation condition occurs. Once a trigger occurs, the process goes to block 504, which compares the current day of the week (TODAY) to the enforcement activation attribute DAY. If the day of the week is different from the value specified by DAY, the process moves to block 506, which initializes the following variables: CNT, which is set to the value of N defined by rule 500; START, which is set to the start time T; and a variable DONE, which is set to FALSE to indicate that the rule is active, even if it is not being enforced at the moment.

If instead, at block 504, the day of the week is equal to the DAY attribute, the process moves to block 508, which checks to see if enforcement is done for the day. If so, the process returns to the top of the loop; otherwise, the process moves to block 510.

At block 510, the current CNT value is checked; if the count value not greater than zero, the process moves to block 512, where the variable DONE is set to TRUE, to indicate that the policy has been enforced the maximum number of times N for the current day, and then returns to the top of the loop. If at block 510 the count value is greater than zero, the process moves to block 514.

At block 515, the current time, indicated by the variable NOW, is checked to see whether the time for START has passed. If not, the time for enforcement has not arrived yet, so the process returns to the top of the loop. If NOW is later than the START time, the process moves to block 516, where the rule is enforced, and then to block 518, which decrements the counter CNT, and returns to the top of the loop.

Thus, FIG. 5 illustrates an automatically recurrent policy rule that is defines how many times a policy rule may be applied or enforced during a particular day. This embodiment may be suitable for a one-shot policy, e.g., a policy that is applied for an instance rather than applied for a window of time. For policies that should be applied for a window of time, on the other hand, rule 500 could include additional parameters such as the parameter L described above. Alternatively, rule 500 could instead define another kind of enforcement deactivation condition rather than an enforcement duration L. For example, rule 500 could define an event that, if detected by the policy enforcement note, causes the policy enforcement node to deactivate enforcement of the policy. In one example, a policy rule may enforce a data download rate ceiling starting at a busy time of day and ending upon detection that the number of subscribers or sessions falls below a threshold value.

It should be noted that FIGS. 4 and 5 illustrate two example embodiments of the subject matter described herein, and that other embodiments are contemplated. For example, the specific form and content of the enforcement activation condition, the enforcement deactivation condition if present, and the recurrence attributes, as well as how they are used to determine when to enforce or not enforce a policy rule as well as when the enforcement recurs, may vary widely and still remain within the scope of the subject matter described herein.

FIG. 6 illustrates the syntax of an exemplary policy rule that defines an enforcement activation condition, an enforcement deactivation condition, and an enforcement recurrence attribute according to an embodiment of the subject matter described herein. In the embodiment illustrated in FIG. 6, a Charging-Rule-Install rule has an attribute-value pair (AVP) header identifying the rule as type 1001, which includes an optional Charging-Rule-Definition, an optional Charging-Rule-Name, and optional Charging-Rule-Base-Name, a Bearer-Identifier, a Rule-Activation-Time, a Rule-Deactivation-Time, a Resource-Allocation-Notification, an Automatic-Rule-Enforcement section, and optionally other AVPs. The Automatic-Rule-Enforcement AVP has an AVP header identifying the automatic, recurrent policy rule as type XXXX, and additional attributes such as a Day-For-Enforcement, a Time-For-Enforcement, a Duration-For-Enforcement, a Recurrence-Interval, and a Number-Of-Recurrences.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for automatic, recurrent enforcement of a policy rule, the method comprising:

providing, to a node for enforcing policy rules in a telecommunications network, an automatically recurrent policy rule, the policy rule defining an enforcement activation condition and including an enforcement recurrence attribute comprising at least one of a recurrence interval and a number of recurrences, wherein providing an automatically recurrent policy rule to the node includes transmitting a Diameter signaling message specifying the automatically recurrent policy rule to the node; and using, at the node, the enforcement activation condition and the enforcement recurrence attribute to automatically recurrently activate the enforcement of the policy rule according to the enforcement recurrence attribute, wherein using the enforcement activation condition and the enforcement recurrence attribute to automatically activate the enforcement of the policy rule according to the enforcement recurrence attribute comprises:

determining whether the enforcement activation condition for the policy rule has been satisfied, and, upon a determination that the enforcement activation condition for the policy rule has been satisfied, activating enforcement of the policy rule;

determining, based on the enforcement activation condition and the enforcement recurrence attribute, whether enforcement of the policy rule should be deactivated, and, upon a determination that enforcement of the policy rule should be deactivated, deactivating enforcement of the policy rule; and determining, based on the enforcement recurrence attribute, a next recurrence of the activation of the policy rule.

2. The method of claim 1 wherein the providing is performed by a policy rules charging and function (PCRF) node.

3. The method of claim 1 wherein the using is performed by a policy and charging enforcement function (PCEF) node.

4. The method of claim 1 wherein the using is performed by a bearer binding and event reporting function (BBERF) node.

5. The method of claim 1 further comprising determining whether enforcement of the policy rule has been activated, and, upon a determination that the policy rule has been activated, enforcing the policy rule.

6. A network entity for automatic, recurrent enforcement of a policy rule, the network entity comprising:

a rules database for maintaining policy rules, wherein at least one policy rule comprises an automatically recurrent policy rule that defines an enforcement activation condition and includes an enforcement recurrence attribute comprising at least one of a recurrence interval and a number of recurrences and wherein the rules database is configured to receive the policy rule via a Diameter signaling message that specifies the automatically recurrent policy rule; and a rules engine for using the enforcement activation condition and the enforcement recurrence attribute to automatically recurrently activate the enforcement of the policy rule according to the enforcement recurrence attribute, wherein the rules engine is configured to recurrently activate the enforcement of the policy rule according to the enforcement recurrence attribute by:

determining whether the enforcement activation condition for the policy rule has been satisfied, and, upon a determination that the enforcement activation condition for the policy rule has been satisfied, activating enforcement of the policy rule;

determining, based on the enforcement activation condition and the enforcement recurrence attribute, whether enforcement of the policy rule should be deactivated, and, upon a determination that enforcement of the policy rule should be deactivated, deactivating enforcement of the policy rule; and determining, based on the enforcement recurrence attribute, a next recurrence of the activation of the policy rule.

7. The network entity of claim 6 wherein rules database is configured to receive the automatically recurrent policy rule and store the received policy rule.

8. The network entity of claim 7 wherein the rules database is configured to receive the policy rule from a policy and charging rules function (PCRF) node.

9. The network entity of claim 6 wherein the network entity comprises a policy and charging enforcement function (PCEF) node.

10. The network entity of claim 6 wherein the network entity comprises a bearer binding and event reporting function (BBERF) node.

11. The network entity of claim 6 wherein the rules engine is configured to determine whether enforcement of the policy rule has been activated, and, upon a determination that the policy rule has been activated, enforce the policy rule.

12. A system for automatic, recurrent enforcement of a policy rule, the system comprising:

a first node for enforcing an automatically recurrent policy rule in a telecommunications network, wherein:

the automatically recurrent policy rule is received from a second node for providing the automatically recurrent policy rule to the first node;

the automatically recurrent policy rule is received via a Diameter signaling message specifying the automatically recurrent policy rule;

the automatically recurrent policy rule defines an enforcement activation condition and includes an enforcement recurrence attribute comprising at least one of a recurrence interval and a number of recurrences; and the first node uses the enforcement activation condition and the enforcement recurrence attribute to automatically recurrently activate the enforcement of the policy rule according to the enforcement recurrence attribute, wherein the first node is configured to use the enforcement activation condition and the enforcement recurrence attribute to recurrently activate the enforcement of the policy rule according to the enforcement recurrence attribute by:

determining whether the enforcement activation condition for the policy rule has been satisfied, and, upon a determination that the enforcement activation condition for the policy rule has been satisfied, activating enforcement of the policy rule;

determining, based on the enforcement activation condition and the enforcement recurrence attribute, whether enforcement of the policy rule should be deactivated, and, upon a determination that enforcement of the policy rule should be deactivated, deactivating enforcement of the policy rule; and determining, based on the enforcement recurrence attribute, a next recurrence of the activation of the policy rule.

13. The system of claim 12 wherein the second node comprises a policy and charging rules function (PCRF) node.

14. The system of claim 12 wherein the first node comprises a policy and charging enforcement function (PCEF) node.

15. The system of claim 12 wherein the first node comprises a bearer binding and event reporting function (BBERF) node.

16. A non-transitory computer readable medium having stored thereon executable instructions that when executed by the processor of a computer control the computer to perform steps comprising:

providing, to a node for enforcing policy rules in a telecommunications network, an automatically recurrent policy rule, the policy rule defining an enforcement activation condition and including an enforcement recurrence attribute comprising at least one of a recurrence interval and a number of recurrences, wherein providing an automatically recurrent policy rule to the node includes transmitting a Diameter signaling message specifying the automatically recurrent policy rule to the node; and using, at the node, the enforcement activation condition and the enforcement recurrence attribute to automatically recurrently activate the enforcement of the policy rule according to the enforcement recurrence attribute, wherein using the enforcement activation condition and the enforcement recurrence attribute to automatically activate the enforcement of the policy rule according to the enforcement recurrence attribute comprises:

determining whether the enforcement activation condition for the policy rule has been satisfied, and, upon a determination that the enforcement activation condition for the policy rule has been satisfied, activating enforcement of the policy rule;

determining, based on the enforcement activation condition and the enforcement recurrence attribute, whether enforcement of the policy rule should be deactivated, and, upon a determination that enforcement of the policy rule should be deactivated, deactivating enforcement of the policy rule; and determining, based on the enforcement recurrence attribute, a next recurrence of the activation of the policy rule.

* * * * *